United States Patent
Liesen et al.

(10) Patent No.: US 6,255,261 B1
(45) Date of Patent: Jul. 3, 2001

(54) (METH) ACRYLATE COPOLYMER POUR POINT DEPRESSANTS

(75) Inventors: Gregory P. Liesen, Mechanicsville; Tze Chi Jao, Glen Allen; Shoutian Li, Midlothian, all of VA (US)

(73) Assignee: Ethyl Corporation, Richmond, VA (US)

( * ) Notice: Subject to any disclaimer, the term of this patent is extended or adjusted under 35 U.S.C. 154(b) by 0 days.

(21) Appl. No.: 09/401,693

(22) Filed: Sep. 22, 1999

(51) Int. Cl.⁷ .................. C10M 145/14; C08F 220/18
(52) U.S. Cl. .................. 508/469; 526/329.5; 526/329.7
(58) Field of Search .............................................. 508/469

(56) References Cited

U.S. PATENT DOCUMENTS

| | | | |
|---|---|---|---|
| 2,655,479 | 10/1953 | Munday et al. | 252/56 |
| 3,598,736 | * 8/1971 | Van Der Meij et al. | 508/469 |
| 4,146,492 | 3/1979 | Cusano et al. | 252/56 |
| 4,867,894 | 9/1989 | Pennewiss et al. | 252/56 |
| 5,112,509 | 5/1992 | Brink, Jr. | 252/56 |
| 5,312,884 | 5/1994 | Gore et al. | 526/328 |
| 5,368,761 | 11/1994 | Gore et al. | 252/56 |
| 5,534,175 | 7/1996 | Cantiani | 508/469 |
| 5,834,408 | 11/1998 | Mishra et al. | 508/469 |
| 5,955,405 | * 9/1999 | Liesen et al. | 508/469 |
| 6,051,538 | * 4/2000 | Majerczak | 508/469 |

FOREIGN PATENT DOCUMENTS

| | | |
|---|---|---|
| 236844 B1 | 9/1987 | (EP) . |
| 1559952 | 1/1980 | (GB) . |

* cited by examiner

*Primary Examiner*—Ellen M. McAvoy
(74) *Attorney, Agent, or Firm*—Thomas Hamilton; James T. Moore

(57) ABSTRACT

Poly (meth) acrylate copolymers comprising from about 5 to about 60 weight percent of a C11–C15 alkyl (meth) acrylate; and from about 95 to about 40 weight percent of a C16–C30 alkyl (meth) acrylate provide excellent low temperature properties to lubricating oils.

16 Claims, No Drawings

US 6,255,261 B1

(METH) ACRYLATE COPOLYMER POUR POINT DEPRESSANTS

TECHNICAL FIELD

This invention relates to polyalkyl (meth) acrylate copolymers having excellent low temperature properties. The present invention also relates to the use of these copolymers as pour point depressants for lubricating oils.

BACKGROUND OF THE INVENTION

Polymethacrylate pour point depressants (PMA PPD's) are well known in the lubricating industry. Many attempts have been made to produce PMA PPD's that improve the low temperature viscometrics of various lubricating compositions.

PPD additives improve the low-temperature performance of an oil by modifying the wax crystallization process. A wide variety of chemical types are currently available, and include polyalkylmethacrylates, styrenated polyesters, alkylated polystyrenes and alkylated naphthalenes. The present invention is directed to novel alkyl (meth)acrylate polymers which exhibit desired low temperature viscometrics. More specifically, the invention is directed to PMA PPDs that exhibit outstanding low temperature properties in lubricating oils for applications such as crankcase lubricants and automatic transmission fluids. The oil chemist is constantly searching for PPDs that achieve optimum low-temperature performance at low concentrations. The present invention addresses the need for an improved PPD.

U.S. Pat. No. 2,655,479 to Munday et al. claims a pour point depressant composition consisting of a blend of two copolymers, the first copolymer having an average side chain length of about 12.7 while the second copolymer has an average side chain length of about 11.2.

U.K. Patent No. 1,559,952 discloses a mixture of two classes of oil soluble polyalkyl (meth)acrylates as pour point depressants.

U.S. Pat. No. 4,146,492 discloses lubricating oil compositions comprising between about 0.5 and 30 wt. % of a specifically defined ethylene-propylene copolymer and between about 0.005 to 10 wt. % of a neat interpolymeric polyalkylacrylate of (A) $C_1$–$C_{15}$ alkylacrylate and (B) $C_{16}$–$C_{22}$ alkylacrylate having a weight ratio of A:B of between about 90:10 and 50:50, a molecular weight of from 1000 to 25,000 and an average alkyl side chain length of between about 11 and 16 carbons.

U.S. Pat. No. 4,867,894 discloses pour point improving additives for mineral oils comprising from 10 to 30 mole percent methyl methacrylate, 10 to 70 mole percent of a linear C16 to C30 alkyl methacrylate, from 10 to 80 mole percent of a C4–C15 linear alkyl methacrylate and/or a C4 to C40 branched methacrylate, and from 0 to 30 mole percent of a free-radically polymerizable nitrogen-containing monomer having dispersing action.

U.S. Pat. Nos. 5,312,884 and 5,368,761 disclose copolymers useful as pour point depressants for lubricating oils comprising 15–67 mole percent C8–C15 alkyl (meth) acrylates, 3–40 mole percent C16–C24 (meth) acrylates, and from greater than 30–65 mole percent C1–C4 methacrylates. These patents do not teach copolymers containing the specific monomers in the specific proportions required by the present claims.

U.S. Pat. No. 5,534,175 discloses copolymers of unsaturated fatty esters derived from 12–20 mass % of a C1–C3 (meth) acrylate, 45–72 mass % of a C11–C15 (meth) acrylate and 14–30 mass % of a C16–C25 (meth) acrylate.

EP 0 236 844 B1 teaches pour point improving agents derived from methyl methacrylate.

SUMMARY OF THE INVENTION

The present invention is directed to novel polyalkyl (meth) acrylates and their use as pour point depressants for lubricating oils.

The polyalkyl (meth) acrylate copolymers of the present invention comprise units derived from:
(A) about 5 to about 60, preferably 15 to 50, weight percent of a C11–C15 alkyl (meth) acrylate; and
(B) about 95 to about 40, preferably 85 to 50, weight percent of a C16–C30 alkyl (meth) acrylate.

Another embodiment of the present invention comprises lubricating oil compositions containing a mixture of at least one pour point depressant as described above and at least one viscosity index improver.

DETAILED DESCRIPTION OF THE INVENTION

The present invention is directed to polyalkyl (meth) acrylate copolymers comprising units derived from:
(A) from about 5 to about 60 weight percent of a C11–C15 alkyl (meth) acrylate; and
(B) from about 95 to about 40 weight percent of a C16–C30 alkyl (meth) acrylate.

The polyalkyl (meth) acrylate copolymers of the present invention comprise the reaction products of:
(A) from about 5 to about 60, preferably 15 to 50, weight percent of a C11–C15 alkyl (meth) acrylate; and
(B) from about 95 to about 40, preferably 85 to 50, weight percent of a C16–C30 alkyl (meth) acrylate.

The copolymers of the present invention have a relative number average molecular weight of from about 5,000 to about 5,000,000. The copolymers typically have a relative number average molecular weight, as determined by gel permeation chromatography using polymethyl methacrylate standards, between 5,000 and 300,000 when prepared by free-radical polymerization.

As used herein, C11–C15 alkyl (meth) acrylate means an alkyl ester of acrylic or methacrylic acid having a straight or branched alkyl group of 11 to 15 carbon atoms per group such as, undecyl (meth) acrylate, lauryl (meth) acrylate, myristyl (meth) acrylate, dodecyl pentadecyl methacrylate, and mixtures thereof.

As used herein, C16–C30 alkyl (meth) acrylate means an alkyl ester of acrylic or methacrylic acid having a straight or branched alkyl group of 16 to 30 carbon atoms per group such as, stearyl (meth) acrylate, cetyl (meth) acrylate, heptadecyl (meth) acrylate, nonadecyl (meth) acrylate, eicosyl (meth) acrylate, and mixture thereof such as, cetyl-eicosyl (meth) acrylate and cetyl-stearyl (meth) acrylate.

The alkyl (meth) acrylate comonomers containing 11 or more carbon atoms in the alkyl group are generally prepared by standard esterification procedures using technical grades of long chain aliphatic alcohols, and these commercially available alcohols are mixtures of alcohols of varying chain lengths containing between 11 and 20 carbon atoms in the alkyl groups. Consequently, for the purposes of this invention, alkyl (meth) acrylate is intended to include not only the individual alkyl (meth) acrylate product named, but also to include mixtures of the alkyl (meth) acrylates with a predominant amount of the particular alkyl (meth) acrylate named.

In a preferred embodiment, the polyalkyl (meth) acrylate copolymers of the present invention consist essentially of monomers (A) and (B). However, those skilled in the art will appreciate that minor levels of other monomers, polymerizable with the alkyl (meth)acrylates disclosed herein, may be present as long as they do not adversely affect the low temperature properties of the fully formulated fluids, for example, increasing the low temperature pumping viscosity of a lubricating fluid when the pour point depressant is used in combination with a dispersant VI improver. Typically additional monomers are present in an amount of less than about 5 weight percent, preferably in an amount of less than 3 weight percent, most preferably in an amount of less than 1 weight percent. For example, the addition of minor levels of monomers such as C1–C10 alkyl (meth) acrylates, nitrogen-containing alkyl (meth) acrylates, hydroxy- or alkoxy-containing alkyl (meth) acrylates, ethylene, propylene, styrene, vinyl acetate and the like are contemplated within the scope of this invention as long as the presence of these monomers do not materially increase the polarity of the copolymers. In a preferred embodiment the sum of (A) and (B) equals 100%. Thus in a preferred embodiment the low polarity PPD polymers according to the invention do not contain C1–C10 alkyl (meth) acrylates, dispersant (meth) acrylates or other polymerizable non-alkyl (meth) acrylate monomers.

Conventional methods of free-radical polymerization can be used to prepare the copolymers of the present invention. Polymerization of the acrylic and/or methacrylic monomers can take place under a variety of conditions, including bulk polymerization, solution polymerization, usually in an organic solvent, preferably mineral oil, emulsion polymerization, suspension polymerization and non-aqueous dispersion techniques.

Solution polymerization is preferred. In the solution polymerization, a reaction mixture comprising a diluent, the alkyl (meth) acrylate monomers, a polymerization initiator and a chain transfer agent is prepared.

The diluent may be any inert hydrocarbon and is preferably a hydrocarbon lubricating oil that is compatible with or identical to the lubricating oil in which the copolymer is to be subsequently used. The mixture includes, e.g., from about 15 to about 400 parts by weight (pbw) diluent per 100 pbw total monomers and, more preferably, from about 50 to about 200 pbw diluent per 100 pbw total monomers. As used herein, "total monomer charge" means the combined amount of all monomers in the initial, i.e., unreacted, reaction mixture.

In preparing the copolymers of the present invention by free-radical polymerization the (meth) acrylic monomers may be polymerized simultaneously or sequentially, in any order. In a preferred embodiment, the total monomer charge includes from 5 to 60 weight percent, preferably 15 to 50 weight percent, C11–C15 alkyl (meth) acrylate; and 95 to 40 weight percent, preferably 85 to 50 weight percent, C16–C30 alkyl (meth) acrylate.

Suitable polymerization initiators include initiators which disassociate upon heating to yield a free radical, e.g., peroxide compounds such as benzoyl peroxide, t-butyl perbenzoate, t-butyl peroctoate and cumene hydroperoxide; and azo compounds such as azoisobutyronitrile and 2,2'-azobis (2-methylbutanenitrile). The mixture includes from about 0.01 wt % to about 1.0 wt % initiator relative to the total monomer mixture.

Suitable chain transfer agents include those conventional in the art, e.g., dodecyl mercaptan and ethyl mercaptan. The selection of the amount of chain transfer agent to be used is based on the desired molecular weight of the polymer being synthesized as well as the desired level of shear stability for the polymer, i.e., if a more shear stable polymer is desired, more chain transfer agent can be added to the reaction mixture. Preferably, the chain transfer agent is added to the reaction mixture in an amount of 0.01 to 3 weight percent, preferably 0.02 to 2.5 weight percent, relative to the monomer mixture.

By way of example and without limitation, the reaction mixture is charged to a reaction vessel that is equipped with a stirrer, a thermometer and a reflux condenser and heated with stirring under a nitrogen blanket to a temperature from about 50° C. to about 125° C. for a period of about 0.5 hours to about 6 hours to carry out the polymerization reaction.

In a further embodiment, a portion, e.g., about 25 to 60% of the reaction mixture is initially charged to the reaction vessel and heated. The remaining portion of the reaction mixture is then metered into the reaction vessel, with stirring and while maintaining the temperature of the batch within the above describe range, over a period of about 0.5 hours to about 3 hours. A viscous solution of the copolymer of the present invention in the diluent is obtained as the product of the above-described process.

To form the lubricating oils of the present invention, a base oil is treated with the copolymer of the invention in a conventional manner, i.e., by adding the copolymer to the base oil to provide a lubricating oil composition having the desired low temperature properties. Preferably, the lubricating oil contains from about 0.01 to about 20 parts by weight (pbw), preferably 0.02 to 5 pbw, most preferably 0.025 to 1 pbw, of the neat copolymer (i.e., excluding diluent oil) per 100 pbw base oil. In a particularly preferred embodiment, the copolymer is added to the base oil in the form of a relatively concentrated solution of the copolymer in a diluent, e.g., a solution of about 100 pbw of the copolymer dissolved in from about 15 pbw to 600 pbw of the diluent used in the above described polymerization process. The diluent oil may be any of the oils referred to below that are suitable for use as base oils.

The finished lubricating oil composition may include other additives in addition to the copolymer of the present invention, e.g., oxidation inhibitors, corrosion inhibitors, friction modifiers, antiwear and extreme pressure agents, detergents, dispersants, antifoamants, viscosity index improvers and additional pour point depressants.

Another embodiment of the present invention comprises lubricating oil compositions containing the pour point depressants described above and a viscosity index improver. Viscosity index improvers suitable for use in the present invention include styrene-maleic esters, polyalky (meth) acrylates, olefin homopolymers (e.g., polyisobutylene) and olefin copolymers.

In a preferred embodiment of the present invention, the lubricating oil compositions contain the pour point depressants described above and a multi-functional olefin copolymer viscosity index improver containing dispersant and/or dispersant/antioxidant moieties.

The substrate employed in multi-functional olefin copolymer additive of the present invention may be prepared from ethylene and propylene or it may be prepared from ethylene and at least one higher olefin within the range of $C_3$ to $C_{23}$ alpha-olefins.

Preferred copolymers for use in forming the multi-functional viscosity index improvers of the present invention are copolymers of ethylene and one or more $C_3$ to $C_{23}$ alpha-olefins. Copolymers of ethylene and propylene are most preferred. Other alpha-olefins suitable in place of propylene to form the copolymer or to be used in combination with ethylene and propylene to form a terpolymer include 1-butene, 1-pentene, 1-hexene, 1-octene and styrene; α, ω-diolefins such as 1,5-hexadiene, 1,6-heptadiene, 1,7-octadiene; branched chain alpha-olefins such as 4-methylbutene-1,5-methylpentene-1 and 6-methylheptene-1; and mixtures thereof.

More complex polymer substrates, often designated as interpolymers, may be prepared using a third component. The third component generally used to prepare an interpolymer substrate is a polyene monomer selected from non-conjugated dienes and trienes. The non-conjugated diene component is one having from 5 to 14 carbon atoms in the chain. Preferably, the diene monomer is characterized by the presence of a vinyl group in its structure and can include cyclic and bicyclo compounds. Representative dienes include 1,4-hexadiene, 1,4-cyclohexadiene, dicyclopentadiene, 5-ethylidene-2-norborene, 5-methylene-2-norborene, 1,5-heptadiene, and 1,6-octadiene. A mixture of more than one diene can be used in the preparation of the interpolymer. A preferred non-conjugated diene for preparing a terpolymer or interpolymer substrate is 1,4-hexadiene.

The triene component will have at least two non-conjugated double bonds, and up to about 30 carbon atoms in the chain. Typical trienes useful in preparing the interpolymer of the invention are 1-isopropylidene-3α,4,7,7α-tetrahydroindene, 1-isopropylidenedicyclopentadiene, dihydro-isodicyclopentadiene, and 2-(2-methylene-4-methyl-3-pentenyl)[2.2.1] bicyclo-5-heptene.

Ethylene-propylene or higher alpha-olefin copolymers may consist of from about 15 to 80 mole percent ethylene and from about 85 to 20 mole percent $C_3$ to $C_{23}$ alpha-olefin with the preferred mole ratios being from about 35 to 75 mole percent ethylene and from about 65 to 25 mole percent of a $C_3$ to $C_{23}$ alpha-olefin, with the more preferred proportions being from 50 to 70 mole percent ethylene and 50 to 30 mole percent $C_3$ to $C_{23}$ alpha-olefin, and the most preferred proportions being from 55 to 65 mole percent ethylene and 45 to 35 mole percent $C_3$ to $C_{23}$ alpha-olefin.

Terpolymer variations of the foregoing polymers may contain from about 0.1 to 10 mole percent of a non-conjugated diene or triene.

The polymer substrate, that is the ethylene copolymer or terpolymer, typically is an oil-soluble, linear or branched polymer having a number average molecular weight from about 20,000 to 150,000 as determined by gel permeation chromatography and universal calibration standardization, with a preferred number average molecular weight range of 30,000 to 110,000.

The terms polymer and copolymer are used generically to encompass ethylene copolymers, terpolymers or interpolymers. These materials may contain minor amounts of other olefinic monomers so long as the basic characteristics of the ethylene copolymers are not materially changed.

The polymerization reaction used to form the ethylene-olefin copolymer substrate is generally carried out in the presence of a conventional Ziegler-Natta or metallocene catalyst system. The polymerization medium is not specific and can include solution, slurry, or gas phase processes, as known to those skilled in the art. When solution polymerization is employed, the solvent may be any suitable inert hydrocarbon solvent that is liquid under reaction conditions for polymerization of alpha-olefins; examples of satisfactory hydrocarbon solvents include straight chain paraffins having from 5 to 8 carbon atoms, with hexane being preferred. Aromatic hydrocarbons, preferably aromatic hydrocarbon having a single benzene nucleus, such as benzene, toluene and the like; and saturated cyclic hydrocarbons having boiling point ranges approximating those of the straight chain paraffinic hydrocarbons and aromatic hydrocarbons described above, are particularly suitable. The solvent selected may be a mixture of one or more of the foregoing hydrocarbons. When slurry polymerization is employed, the liquid phase for polymerization is preferably liquid propylene. It is desirable that the polymerization medium be free of substances that will interfere with the catalyst components.

The olefin copolymer may be functionalized by grafting with an ethylenically unsaturated carboxylic acid material (e.g., maleic anhydride) to form an acylated olefin copolymer and further reacting said acylated olefin copolymer with an amine compound, or the olefin copolymer can be functionalized by grafting with an ethylenically unsaturated oxygen and/or nitrogen containing monomer.

In one embodiment, the multi-functional olefin copolymer viscosity index improver is prepared by grafting an ethylenically unsaturated carboxylic acid material onto the prescribed polymer backbone to form an acylated ethylene copolymer. The carboxylic reactants which are suitable for grafting onto the ethylene copolymer contain at least one ethylenic bond and at least one, preferably two, carboxylic acid or its anhydride groups or a polar group which is convertible into said carboxyl groups by oxidation or hydrolysis. Preferably, the carboxylic reactants are selected from the group consisting of acrylic, methacrylic, cinnamic, crotonic, maleic, fumaric and itaconic reactants. More preferably, the carboxylic reactants are selected from the group consisting of maleic acid, fumaric acid, maleic anhydride, or a mixture of two or more of these. Maleic anhydride or a derivative thereof is generally most preferred due to its commercial availability and ease of reaction. In the case of unsaturated ethylene copolymers or terpolymers, itaconic acid or its anhydride is preferred due to its reduced tendency to form a cross-linked structure during the free-radical grafting process.

The ethylenically unsaturated carboxylic acid materials typically can provide one or two carboxylic groups per mole of reactant to the grafted polymer. That is, acrylic acid can provide one carboxylic group per molecule to the grafted polymer while maleic anhydride can provide two carboxylic groups per molecule to the grafted polymer.

The carboxylic reactant is preferably grafted onto the prescribed polymer backbone in an amount to provide 0.1 to about 1, preferably 0.3 to 0.75 carboxylic groups per 1000 number average molecular weight units of the polymer backbone, more preferably 0.3 to 0.5 carboxylic groups per 1000 number average molecular weight. For example, a copolymer substrate with Mn of 20,000 is grafted with 2 to 20 carboxylic groups per polymer chain or 1 to 10 moles of maleic anhydride per mole of polymer. A copolymer with Mn of 100,000 is grafted with 10 to 100 carboxylic groups per polymer chain or 5 to 50 moles of maleic anhydride per polymer chain.

The grafting reaction to form the acylated olefin copolymers is generally carried out with the aid of a free-radical initiator either in solution or in bulk, as in an extruder or intensive mixing device. When the polymerization is carried out in hexane solution, it is economically convenient to carry out the grafting reaction in hexane as described in U.S. Pat. Nos. 4,340,689, 4,670,515 and 4,948,842, incorporated herein by reference. The resulting polymer intermediate is characterized by having carboxylic acid acylating functionality randomly within its structure.

In the bulk process for forming the acylated olefin copolymers, the olefin copolymer is fed to rubber or plastic processing equipment such as an extruder, intensive mixer or masticator, heated to a temperature of 150° to 400° C. and the ethylenically unsaturated carboxylic acid reagent and free-radical initiator are separately co-fed to the molten polymer to effect grafting. The reaction is carried out optionally with mixing conditions to effect shearing and grafting of the ethylene copolymers according to U.S. Pat. No. 5,075,383, incorporated herein by reference. The processing equipment is generally purged with nitrogen to prevent oxidation of the polymer and to aid in venting unreacted reagents and byproducts of the grafting reaction. The residence time in the processing equipment is sufficient to provide for the desired degree of acylation and to allow for purification of the acylated copolymer via venting. Mineral or synthetic lubricating oil may optionally be added to the processing equipment after the venting stage to dissolve the acylated copolymer.

The free-radical initiators which may be used to graft the ethylenically unsaturated carboxylic acid material to the polymer backbone include peroxides, hydroperoxides, peresters, and also azo compounds and preferably those which have a boiling point greater than 100° C. and decompose thermally within the grafting temperature range to provide free radicals. Representatives of these free-radical initiators are azobutyronitrile, dicumyl peroxide, 2,5-dimethylhexane-2,5-bis-tertiarybutyl peroxide and 2,5-dimethyl-hex-3-yne-2,5-bis-tertiary-butyl peroxide. The initiator is used in an amount of between about 0.005% and about 1% by weight based on the weight of the reaction mixture.

Other methods known in the art for effecting reaction of ethylene-olefin copolymers with ethylenically unsaturated carboxylic reagents, such as halogenation reactions, thermal or "ene" reactions or mixtures thereof, can be used instead of the free-radical grafting process. Such reactions are conveniently carried out in mineral oil or bulk by heating the reactants at temperatures of 2500 to 400° C. under an inert atmosphere to avoid the generation of free radicals and oxidation byproducts. "Ene" reactions are a preferred method of grafting when the ethylene-olefin copolymer contains unsaturation.

The acylated olefin copolymer is reacted with an amine compound selected from the group consisting of:

(a) an N-arylphenylenediamine represented by the formula:

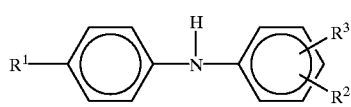

in which $R^1$ is hydrogen, —NH-aryl, —NH-arylalkyl, —NH-alkyl, or a branched or straight chain radical having from 4 to 24 carbon atoms that can be alkyl, alkenyl, alkoxyl, aralkyl, alkaryl, hydroxyalkyl or aminoalkyl; $R^2$ is —NH$_2$, CH$_2$—(CH$_2$)$_n$—NH$_2$, CH$_2$-aryl—NH$_2$, in which n has a value from 1 to 10; and $R^3$ is hydrogen, alkyl, alkenyl, alkoxyl, aralkyl, alkaryl having from 4 to 24 carbon atoms;

(b) an aminothiazole from the group consisting of aminothiazole, aminobenzothiazole, aminobenzothiadiazole and aminoalkylthiazole;

(c) an aminocarbazole represented by the formula:

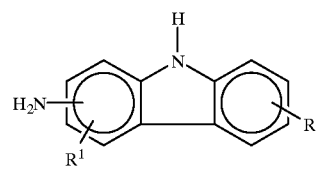

in which R and $R^1$ represent hydrogen or an alkyl, alkenyl, or alkoxy radical having from 1 to 14 carbon atoms;

(d) an aminoindole represented by the formula:

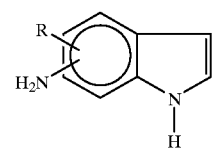

in which R represents hydrogen or an alkyl radical having from 1 to 14 carbon atoms;

(e) an aminopyrrole represented by the formula:

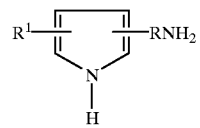

in which R is a divalent alkylene radical having 2 to 6 carbon atoms and $R^1$ is hydrogen or an alkyl radical having from 1 to 14 carbon atoms;

(f) an amino-indazolinone represented by the formula:

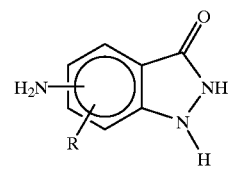

in which R is hydrogen or an alkyl radical having from 1 to 14 carbon atoms;

(g) an aminomercaptotriazole represented by the formula:

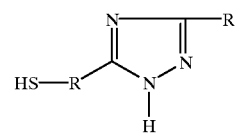

in which R can be absent or is a $C_1$–$C_{10}$ linear or branched hydrocarbon selected from the group consisting of alkyl, alkenyl, arylalkyl, or aryl;

(h) an aminoperimidine represented by the formula:

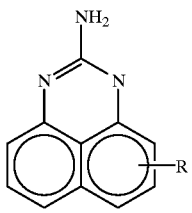

in which R represents hydrogen or an alkyl or alkoxyl radical having from 1 to 14 carbon atoms;

(i) aminoalkyl imidazoles, such as 1-(2-aminoethyl) imidazole, 1-(3-aminopropyl) imidazole; and (j) aminoalkyl morpholines, such as 4-(3-aminopropyl) morpholine.

Particularly preferred polyamimes for use in the present invention are the N-arylphenylenediamines, more specifically the N-phenylphenylenediamines, for example, N-phenyl-1,4-phenylenediamine, N-phenyl-1,3-phenylendiamine, and N-phenyl-1,2-phenylenediamine.

It is preferred that the polyamines contain only one primary amine group so as to avoid coupling and/or gelling of the olefin copolymers.

The reaction between the polymer substrate intermediate having grafted thereon a carboxylic acid acylating function and the prescribed polyamine compound is preferably conducted by heating a solution of the polymer substrate under inert conditions and then adding the polyamine compound to the heated solution generally with mixing to effect the reaction. It is convenient to employ an oil solution of the polymer substrate heated to 140° to 175° C., while maintaining the solution under a nitrogen blanket. The polyamine compound is added to this solution and the reaction is effected under the noted conditions.

Typically, the polyamine compound(s) is (are) dissolved in a surfactant and added to a mineral or synthetic lubricating oil or solvent solution containing the acylated olefin copolymer. This solution is heated with agitation under an inert gas purge at a temperature in the range of 120° to 200° C. as described in U.S. Pat. No. 5,384,371, the disclosure of which is herein incorporated by reference. The reactions are carried out conveniently in a stirred reactor under nitrogen purge. However, it is also possible to add a surfactant solution of the polyamine compound to zones downstream from the graft reaction-vent zones in a twin screw extruder reactor.

Multi-functional viscosity index improvers described above are known in the art and are commercially available. These products and the processes for making them are taught in, for example, U.S. Pat. Nos. 4,732,942; 4,863,623; 5,075,383; 5,112,508; 5,238,588; and EP 922 752, each of which is incorporated herein by reference.

In another embodiment of the present invention, the multi-functional viscosity index improver comprises the reaction product of a nitrogen or an oxygen and nitrogen containing ethylenically unsaturated, aliphatic or aromatic monomer grafted on to an olefin copolymer. Suitable nitrogen or oxygen and nitrogen containing ethylenically unsaturated monomers include N-vinyl imidazole, 1-vinyl-2-pyrrolidinone, N-allyl imidazole, allyl amines, 1-vinyl pyrrolidone, 2-vinyl pyridine, 4-vinyl pyridine, N-methyl-N-vinyl acetamide, diallyl formamide, N-methyl-N-allyl formamide, N-ethyl-N-allyl formamide, N-cyclohexyl-N-allyl formamide, 4-methyl-5-vinyl thiazole, N-allyl di-iso-octyl phenothiazine, 2-methyl-1-vinylimidazole, 3-methyl-1-vinylpyrazole, N-vinyl purine, N-vinyl piperazines, N-vinyl succinimide, vinylpiperidines, vinylmorpholines, and mixtures thereof.

The multi-functional copolymers described above, as well as processes for preparing them, are taught in U.S. Pat. Nos. 4,092,255; 4,170,561; 4,146,489; 4,715,975; 4,769,043; 4,810,754; 5,294,354; 5,523,008; 5,663,126; and 5,814,586; and PCT Publication WO 97/47709, each of which is incorporated herein by reference.

Other suitable viscosity index improvers useful in the practice of this invention include those based on alternating or block or random copolymeric backbones formed from (i) one or more vinylaromatic monomers and (ii) maleic anhydride, maleic acid or mono- or diesters of maleic acid, or mixtures of any two or more of such maleic monomers. The vinylaromatic monomers include styrene, alpha-methyl styrene, ring-alkyl substituted styrenes, vinylnaphthalenes, and the like. Styrene is the preferred monomer. However, combinations of a major amount (on a molar basis) of styrene with minor amounts of other vinylaromatic monomers such as o-methylstyrene, m-methylstyrene, p-methylstyrene, p-ethylstyrene, alpha-methylstyrene, 2,4-dimethylstyrene, 3,5-dimethylstyrene, and the like are also quite useful. Also combinations of styrene and/or other vinylaromatics with minor amounts (e.g., up to 20 mole %) of other vinyl monomers such as vinyl alkyl ethers, vinyl esters, etc. can be considered for use.

The preferred comonomer for copolymerization with the vinylaromatic monomer(s) is maleic anhydride. Most preferably maleic anhydride is copolymerized with one or more vinylaromatic monomers in molar proportions in the range of from 1 to 2 moles of vinylaromatics per mole of maleic anhydride (or other maleic monomer, such as maleic acid, maleic ester, or the like). Use of equimolar proportions is especially preferred. Thus alternating polymers made from styrene and maleic anhydride are preferred for use in preparing the component c) viscosity index improvers employed in the compositions of this invention.

Copolymerization of the vinylaromatic monomer(s) with the maleic-type monomer(s) is usually effected in a suitable liquid aromatic hydrocarbon such as toluene, xylene, ethylbenzene, etc., at temperatures in the range of about 75 to about 130° C. (preferably 80 to 100° C.) using a suitable free radical initiator such as benzoyl peroxide, acetyl peroxide, azoisobutyronitrile, tert-butyl perbenzoate, cumene hydroperoxide, and the like.

Amounts of initiator in the range of about 0.025 to about 5 wt % based on total weight of monomers charged are generally preferred.

When using maleic anhydride, maleic acid, or partial esters of maleic acid, the resultant polymer is reacted with a suitable monohydric alcohol or mixture of alcohols, preferably one or more alkanols, most preferably primary alkanols, although minor amounts (e.g., 20 mole % or less) of secondary and/or tertiary alcohol may be used in combination with primary alkanol(s). Small amounts of other substances that react with the carboxylic acid functionality of the polymer can also be employed such as amines, hydrazine, and the like. For details concerning formation of suitable vinylaromatic-maleic ester polymers, see U.S. Pat. No. 2,570,846. For details concerning formation of suitable vinylaromatic-maleic ester polymers using combinations of alcohols and amines or alcohols and hydrazines, see U.S. Pat. Nos. 3,702,300; 3,933,761; 3,956,149; 3,959,159; 4,080,303; 4,284,414; 4,604,221; 4,607,173; 4,654,050; 4,654,403; and 4,734,446. The disclosures of each of the foregoing patents are incorporated herein by reference.

When conducting esterification of the vinylaromatic-maleic-type copolymer the alcohol or mixture of alcohols is preferably reacted with the copolymer at temperatures in the range of about 110 to about 200° C. for 3 to 12 hours using an esterification catalyst such as concentrated sulfuric acid, p-toluene sulfonic acid, etc. As a general rule, the higher the temperature the shorter the reaction time. It is particularly desirable to remove water and/or excess alcohols(s) by use of stripping or distillation procedures. A suitable base such as an amine is then added to neutralize acid in the system, such as the sulfuric acid catalyst. Complete neutralization reaction is best effected by maintaining the mixture at 130 to 160° C. for 1 to 2 hours with stirring.

Suitable commercially available styrene-maleic ester copolymers include Lubrizol® 3702 dispersant type viscosity improver and Lubrizols® 3715 dispersant type viscosity index improver, among others. Another suitable styrene-ester polymer is Lubrizol® 3706 dispersant type viscosity improver.

Preferred base oils contemplated for use in this invention include mineral oils, poly-alpha-olefin synthetic oils and mixtures thereof. Suitable base oils also include basestocks obtained by isomerization of synthetic wax and slack wax, as well as basestocks produced by hydrocracking (rather than solvent extracting) the aromatic and polar components of the crude. In general, both the mineral and synthetic base oils will each have a kinematic viscosity ranging from about 1 to about 40 cSt at 100° C., although typical applications will require each oil to have a viscosity ranging from about 2 to about 20 cSt at 100° C.

The mineral oils useful in this invention include all common mineral oil base stocks. This would include oils that are naphthenic or paraffinic in chemical structure. Oils that are refined by conventional methodology using acid, alkali, and clay or other agents such as aluminum chloride, or they may be extracted oils produced, for example, by solvent extraction with solvents such as phenol, sulfur dioxide, furfural, dichlordiethyl ether, etc. They may be hydrotreated or hydrorefined, dewaxed by chilling or catalytic dewaxing processes, or hydrocracked. The mineral oil may be produced from natural crude sources or be composed of isomerized wax materials or residues of other refining processes. The preferred synthetic oils are oligomers of a-olefins, particularly oligomers of 1-decene, also known as poly-alphaolefins or PAO's.

Typically the mineral oils will have kinematic viscosities of from 2 cSt to 40 cSt at 100° C. The preferred mineral oils have kinematic viscosities of from 2 to 20 cSt at 100° C.

The base oils may be derived from refined, re-refined oils, or mixtures thereof. Unrefined oils are obtained directly from a natural source or synthetic source (e.g., coal, shale, or tar sands bitumen) without further purification or treatment. Examples of unrefined oils include a shale oil obtained directly from a retorting operation, a petroleum oil obtained directly from distillation, or an ester oil obtained directly from an esterification process, each of which is then used without further treatment. Refined oils are similar to the unrefined oils except that refined oils have been treated in one or more purification steps to improve one or more properties. Suitable purification techniques include distillation, hydrotreating, dewaxing, solvent extraction, acid or base extraction, filtration, and percolation, all of which are known to those skilled in the art. Re-refined oils are obtained by treating used oils in processes similar to those used to obtain the refined oils. These re-refined oils are also known as reclaimed or reprocessed oils and are often additionally processed by techniques for removal of spent additives and oils breakdown products.

Lubricating oils containing the copolymers of the present invention may be used in a number of different applications including automatic transmission fluids, manual transmission fluids, hydraulic fluids, crankcase applications and shock absorber fluids.

EXAMPLES

To demonstrate the excellent low temperature properties of lubricating oils containing the copolymers of the present invention, lubricant formulations were prepared containing the identical type and amount of detergent/inhibitor package and base oils. These fluids differed only in the type of pour point depressant used.

Table 1 sets forth the compositions of the pour point depressants tested as well as the low temperature viscosity of the finished fluids. The monomers used to form the polyalykl (meth) acrylate PPDs were methyl methacrylate (MMA), lauryl methacrylate (LMA) and cetyl-eicosyl methacrylate (CEMA). The percent by weight of each monomer is set forth in the Table.

TABLE 1

| PPD | MMA | LMA | CEMA |
|---|---|---|---|
| 1 | — | 60 | 40 |
| 2 | — | 46.2 | 53.8 |
| 3 | — | 33.1 | 66.9 |
| 4 | — | 21.5 | 78.5 |
| 5 | — | 20 | 80 |
| 6* | — | 75 | 25 |
| 7* | — | 70.9 | 29.1 |
| 8* | — | — | 100 |
| 9* | 20 | — | 80 |

*Comparative example, not within the scope of the present invention.

Table 2 sets forth the low temperature pumping viscosity of lubricating oil formulations containing PPDs as set forth in Table 1. Three different SAE Viscosity Grades oils, as defined in SAE J300 (APR97) Engine Oil Viscosity Classification, were prepared with the PPDs of Table 1. Within each Grade, the oils contained the same type and amount of a detergent/inhibitor package, dispersant olefin copolymer and base oil blend. The lubricating oils contained a PPD in an amount sufficient to provide approximately 0.06 weight percent of active polymer to the finished oil. The viscosity of each of the 5W-30 samples was measured at −35° C. (−30° C. for the 10W samples) using a mini rotary viscometer (MRV) according to the method of ASTM D-4684-97. Results are set forth below as apparent viscosity (cP). It is desired to have low Low-Temperature Pumping Viscosities. SAE J300 sets a maximum of 60,000 cP at the respective temperatures, with no yield stress.

TABLE 2

| PPD | 5W-30 | 10W-30 | 10W-40 | Average across three grades |
|---|---|---|---|---|
| 1 | 32857 | 33309 | 37066 | 34410.67 |
| 2 | 35025 | 25795 | 31125 | 30648.33 |
| 3 | 36003 | 26234 | 30120 | 30785.67 |
| 5 | 35799 | 25601 | 29916 | 30438.67 |
| 6* | 46877 | 38973 | 59751 | 48533.67 |

*No samples exhibited yield stress

It is clear, from the above Table 2, that the lubricating fluids comprising the polymethacrylate pour point depressants of the present invention exhibit superior low temperature properties compared to polymethacrylate pour point depressants outside the scope of the present invention as evidenced by the superior (i.e., lower) MRV viscosities across a wide range of viscosity grades.

Table 3 sets forth the low temperature pumping viscosity of lubricating oil formulations containing PPDs as set forth in Table 1. SAE 5W-30 Viscosity Grades oils, as defined in SAE J300 (APR97) Engine Oil Viscosity Classification, were prepared with the PPDs of Table 1. The base oil blends of the oils used in Table 3 were different than the base oil blends used in the 5W-30 examples in Table 2. The oils contained the same type and amount of a detergent/inhibitor package and dispersant olefin copolymer. The lubricating oils contained a PPD in an amount sufficient to provide approximately 0.11 weight percent of active polymer to the finished oil. The viscosity of each of the samples was measured at −35° C. using a mini rotary viscometer (MRV) according to the method of ASTM D-4684-97. Results are set forth below as apparent viscosity (cP). It is desired to have low Low-Temperature Pumping Viscosities. SAE J300 sets a maximum of 60,000 cP at −35° C. with no yield stress for SAE 5W Viscosity grades.

TABLE 3

| PPD | MRV @ −35° C. (cP) |
|---|---|
| 2 | 41459 |
| 4 | 39770 |
| 7* | 45040 |
| 8* | 67620 |
| 9* | 46357 |

*No samples exhibited yield stress

It is clear, from the above Table 3, that the lubricating fluids comprising the polymethacrylate pour point depressants of the present invention exhibit superior low temperature properties compared to polymethacrylate pour point depressants outside the scope of the present invention as evidenced by the superior (i.e., lower) MRV viscosities.

This invention is susceptible to considerable variation in its practice. Accordingly, this invention is not limited to the specific exemplifications set forth hereinabove. Rather, this invention is within the spirit and scope of the appended claims, including the equivalents thereof available as a matter of law.

The patentees do not intend to dedicate any disclosed embodiments to the public, and to the extent any disclosed modifications or alterations may not literally fall within the scope of the claims, they are considered to be part of the invention under the doctrine of equivalents.

We claim:

1. A polyalkyl (meth) acrylate copolymer comprising units derived from:
   (A) from about 5 to about 60 weight percent of a C11–C15 alkyl (meth) acrylate; and
   (B) from about 95 to about 40 weight percent of a C16–C30 alkyl (meth) acrylate; obtained by the sequential or simultaneous free-radical polymerization of monomers (A) and (B).

2. A polyalkyl (meth) acrylate copolymer comprising the reaction product(s) of:
   (A) from about 5 to about 60 weight percent of a C11–C15 alkyl (meth) acrylate; and
   (B) from about 95 to about 40 weight percent of a C16–C30 alkyl (meth) acrylate; obtained by the sequential or simultaneous free-radical polymerization of monomers (A) and (B).

3. The copolymer of claim 2 wherein the copolymer has a number average molecular weight of from about 5,000 to about 5,000,000.

4. A lubricating oil composition comprising:
   (A) an oil of lubricating viscosity; and
   (B) a polyalkyl (meth) acrylate copolymer according to claim 2.

5. The lubricating oil composition of claim 4 wherein component (B) is present in an amount of from 0.01 to about 20 parts by weight of active copolymer per 100 parts by weight of oil.

6. The lubricating oil composition of claim 5 wherein component (B) is present in an amount of from 0.02 to about 5 parts by weight of active copolymer per 100 parts by weight of oil.

7. The lubricating oil composition of claim 6 wherein component (B) is present in an amount of from 0.025 to about 1 part by weight of active copolymer per 100 parts by weight of oil.

8. The lubricating oil composition of claim 4 further comprising at least one additive selected from the group consisting of oxidation inhibitors, corrosion inhibitors, friction modifiers, antiwear and extreme pressure agents, detergents, dispersants, antifoamants, viscosity index improvers and additional pour point depressants.

9. A method for improving the low temperature properties of a lubricating oil, said method comprises adding to an oil of lubricating viscosity a polyalkyl (meth) acrylate copolymer according to claim 2.

10. The method of claim 9 wherein said lubricating oil further comprises a viscosity index improver.

11. The method of claim 10 wherein said viscosity index improver comprises a multi-functional viscosity index improver.

12. The method of claim 11 wherein said multi-functional viscosity index improver comprises a multi-functional olefin copolymer.

13. An crankcase lubricating fluid comprising:
   (A) an oil of lubricating viscosity;
   (B) a poly (meth) acrylate copolymer according to claim 2; and a detergent/inhibitor package, wherein the detergent/inhibitor package comprises at least one additive selected from the group consisting of oxidation inhibitors, corrosion inhibitors, friction modifiers, antiwear and extreme pressure agents, detergents, dispersants, antifoamants, and pour point depressants.

14. The crankcase lubricating fluid according to claim 13 further comprising a viscosity index improver.

15. The crankcase lubricating fluid according to claim 14 wherein the viscosity index improver comprises an olefin copolymer.

16. The crankcase lubricating fluid according to claim 15 wherein the viscosity index improver comprises a multi-functional olefin copolymer.

* * * * *